US 8,576,659 B2

(12) United States Patent
Egerev et al.

(10) Patent No.: US 8,576,659 B2
(45) Date of Patent: Nov. 5, 2013

(54) METHOD AND APPARATUS FOR ACOUSTIC IMPEDANCE AND P-WAVE ANISOTROPY MEASUREMENTS

(75) Inventors: Sergey Egerev, Moscow (RU); Victor Yushin, Moscow (RU); Oleg Ovchinnikov, Moscow (RU); Vladimir Dubinsky, Houston, TX (US); Zarema Dubinsky, legal representative, Houston, TX (US); Xiao Ming Tang, Sugar Land, TX (US); Douglas J. Patterson, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 918 days.

(21) Appl. No.: 12/716,085

(22) Filed: Mar. 2, 2010

(65) Prior Publication Data
US 2010/0246325 A1 Sep. 30, 2010

Related U.S. Application Data

(60) Provisional application No. 61/157,048, filed on Mar. 3, 2009.

(51) Int. Cl.
*G01V 1/30* (2006.01)
*G01V 1/02* (2006.01)
*G01V 1/50* (2006.01)

(52) U.S. Cl.
CPC .............. *G01V 1/307* (2013.01); *G01V 1/159* (2013.01); *G01V 1/50* (2013.01); *G01V 2210/6226* (2013.01); *G01V 2210/626* (2013.01)
USPC .................. 367/32; 367/83; 702/11

(58) Field of Classification Search
CPC ......... G01V 1/159; G01V 1/307; G01V 1/50; G01V 2001/40; G01V 2210/6226; G01V 2210/626; H04R 2430/00
USPC ..................... 367/83, 25, 32; 702/11
See application file for complete search history.

(56) References Cited

U.S. PATENT DOCUMENTS

| | | | |
|---|---|---|---|
| 2,732,906 A | | 1/1956 | Mayne |
| 2,869,357 A | * | 1/1959 | Kritz ............... 73/32 R |
| 3,054,084 A | * | 9/1962 | Parssinen et al. ............. 367/141 |
| 3,217,828 A | | 11/1965 | Mendenhall et al. |
| 3,349,367 A | * | 10/1967 | Wisotsky ............ 367/143 |
| 4,648,079 A | * | 3/1987 | Stedtnitz ............ 367/13 |
| 4,779,236 A | | 10/1988 | Sondergeld |
| 4,780,862 A | | 10/1988 | Clerke |
| 4,964,101 A | | 10/1990 | Liu et al. |
| 5,146,050 A | | 9/1992 | Strozekski et al. |
| 5,153,514 A | | 10/1992 | Griffin et al. |
| 5,452,761 A | | 9/1995 | Beard et al. |

(Continued)

OTHER PUBLICATIONS

G. W. Postma; Wave Propagation in a Stratified Medium, Geophysics, vol. XX, No. 4 (Oct. 1955), pp. 780-806, 13 Figs.
Leon Thomsen; Weak elastic anisotropy, Geophysics, vol. 51, No. 10 (Oct. 1986), pp. 1954-1966, 5 Figs., 1 Table.
Arcangelo G. Sena et al.; Kirchhoff migration and velocity analysis for converted and nonconverted waves in anisotropic media, Geophysics, vol. 58, No. 2 (Feb. 1993), pp. 265-276, 11 Figs., 3 Tables.

(Continued)

*Primary Examiner* — Mark Hellner
*Assistant Examiner* — Ari M Diacou
(74) *Attorney, Agent, or Firm* — Mossman Kumar & Tyler PC

(57) ABSTRACT

Measurements of impedance are made using a piezoelectric transducer oriented at different angles to a formation bedding plane. The impedance measurements are then used to estimate the anisotropic velocity of the formation.

13 Claims, 9 Drawing Sheets

(56) References Cited

U.S. PATENT DOCUMENTS

| | | | |
|---|---|---|---|
| 5,598,377 A | | 1/1997 | Fishburn et al. |
| 5,646,379 A | | 7/1997 | Hsu et al. |
| 5,737,220 A | * | 4/1998 | Miller .................. 702/14 |
| 5,758,539 A | | 6/1998 | Naville et al. |
| 6,050,141 A | | 4/2000 | Tello et al. |
| 6,189,383 B1 | | 2/2001 | Tello et al. |
| 6,490,916 B1 | | 12/2002 | Goodwin et al. |
| 6,538,958 B1 | | 3/2003 | Blankinship et al. |
| 6,712,138 B2 | | 3/2004 | Mandal |
| 6,791,899 B2 | | 9/2004 | Blanch et al. |
| 6,864,890 B2 | | 3/2005 | Meek et al. |
| 6,957,700 B2 | | 10/2005 | Mandal |
| 7,149,146 B2 | | 12/2006 | Kuijk et al. |
| 7,310,580 B2 | | 12/2007 | Zhou et al. |
| 7,626,886 B2 | * | 12/2009 | Dubinsky et al. .................. 367/35 |
| 7,689,362 B2 | | 3/2010 | Froelich et al. |
| 2004/0153293 A1 | * | 8/2004 | Blakley .................. 702/191 |
| 2007/0115755 A1 | | 5/2007 | Grechka et al. |
| 2007/0280048 A1 | * | 12/2007 | Dubinsky et al. .................. 367/31 |
| 2008/0298174 A1 | | 12/2008 | Tang et al. |
| 2012/0163126 A1 | * | 6/2012 | Campbell et al. .................. 367/135 |

OTHER PUBLICATIONS

Samuel H. Gray et al.; Kirchhoff migration using eikonal equation traveltimes, Geophysics, vol. 59, No. 5 (May 1994), pp. 810-817, 7 Figs.

Tariq Alkhalifah et al.; Velocity analysis for transversely isotropic media, Geophysics, vol. 60, No. 5 (Sep.-Oct. 1995), pp. 1550-1566, 21 Figs.

Vladimir Grechka et al.; Feasibility of nonhyperbolic moveout inversion in transversely isotropic media, Geophysics, vol. 63, No . 3 (May-Jun. 1998), pp. 957-969, 9 Figs., 1 Table.

Philippe Berthet et al.; Anisotropic Prestack Depth Migration: An Offshore Africa Case Study, 2000 Society of Expliration Geophysicists, pp. 1-7, 6 Figs.

Hengchang Dai et al.; Anisotropic migration and model building for 4C seismic data: A case study from Alba, 2001 SEG 71st International Meeting, pp. 795-798.

H Hou et al.; An electro-acoustics impedance error criterion and its application to active noise control, Applied Acoustics 65 (2004), pp. 485-499.

* cited by examiner

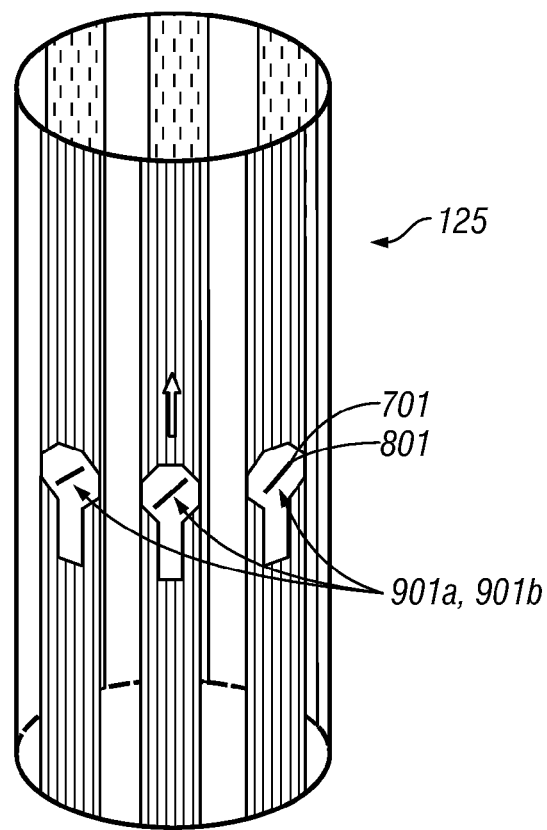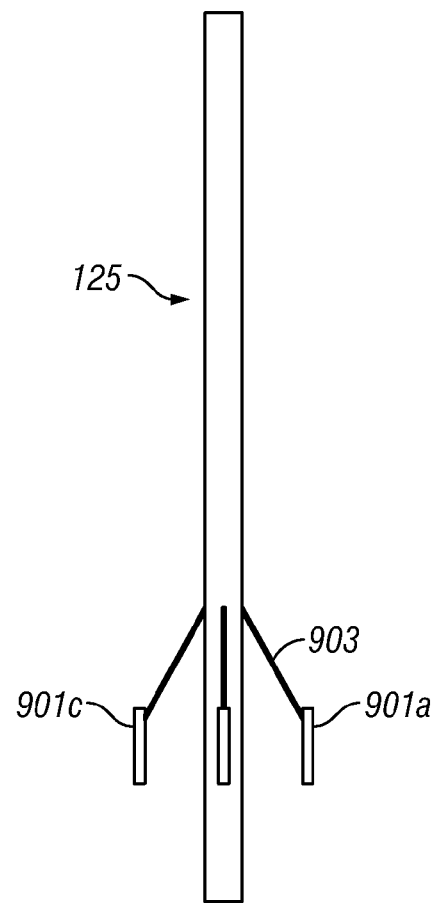
FIG. 9A  FIG. 9B

METHOD AND APPARATUS FOR ACOUSTIC IMPEDANCE AND P-WAVE ANISOTROPY MEASUREMENTS

CROSS-REFERENCES TO RELATED APPLICATIONS

This application claims priority from U.S. Provisional Patent Application Ser. No. 61/157,048 filed on Mar. 3, 2009.

FIELD OF THE DISCLOSURE

The present disclosure is a method of obtaining an anisotropic velocity model for proper depth imaging of seismic data.

BACKGROUND OF THE ART

The search for subsurface hydrocarbon deposits typically involves a multifaceted sequence of data acquisition, analysis, and interpretation procedures. The data acquisition phase involves use of an energy source to generate signals that propagate into the earth and reflect from various subsurface geologic structures. The reflected signals are recorded by a multitude of receivers on or near the surface of the earth, or in an overlying body of water. The received signals, which are often referred to as seismic traces, consist of amplitudes of acoustic energy that vary as a function of time, receiver position, and source position and, most importantly, vary as a function of the physical properties of the structures from which the signals reflect. The data analyst uses these traces along with a geophysical model to develop an image of the subsurface geologic structures.

Common Mid Point (CMP) stacking, also sometimes referred to as Common Depth Point or Common Reflection Point (CDP or CRP, respectively), of seismic field data is well known. See, for example, U.S. Pat. Nos. 3,217,828 to Mendenhall et al., and 2,732,906 to Mayne, which are incorporated herein by reference as a teaching of the CMP technique. In the CMP technique, redundant data are acquired over the same portion of the subsurface using a plurality of source-receiver offsets. Using what is called the Normal Moveout (NMO) velocity, the redundant seismic traces are stacked to give traces with an improved signal-to-noise ratio.

A comparable procedure is used in seismic imaging in areas with complex structure. Again, a redundant data set is combined using a so-called migration velocity to position seismic events in the proper spatial position.

Implicit in the CMP and the migration process is an assumption that the seismic velocity is isotropic. This assumption was conveniently overlooked for years as the effects were relatively minor, and, given the quality of seismic data available, it was difficult to process the data using an anisotropic velocity model. It is only within the last few years that there has been a sustained effort to account for the effects of anisotropy.

P-wave anisotropy is manifested by a change in the compressional wave velocity with direction of propagation in earth formations due to combined effects of sedimentary layering and the intrinsic anisotropy of the rock. Shales, in particular, could exhibit more than a 20% difference in P-wave velocities parallel to bedding and P-wave velocities perpendicular to bedding. Sandstones and limestones usually show smaller differences in velocity with direction of propagation. Postma (1955) showed that a type of anisotropy called transverse isotropy could be exhibited by seismic waves propagating through a thin layering of isotropic materials.

Determination of anisotropic velocities from surface seismic data is difficult due to the relatively poor data quality and the relatively low frequencies of surface seismic data. Nevertheless, there is prior art on the determination of an anisotropic velocity model for depth imaging of seismic data.

Wireline Measurements made in a borehole are generally of higher quality (higher signal-to-noise ratio, commonly called SNR) than surface seismic data. Independent evaluation of the P-Wave velocity components—vertical and horizontal—in an anisotropic formation by conducting conventional wireline logging measurements is not a trivial task. For a vertical borehole (with an axis perpendicular to bedding), the traditional acoustic logging based on analysis of the head wave gives the vertical P-wave velocity component. For a horizontal borehole (with an axis parallel to bedding), the traditional acoustic logging would give the horizontal P-wave velocity component. For an arbitrary borehole inclination, the traditional acoustic logging gives a P-wave velocity that depends upon both the horizontal P-wave velocity component and the vertical P-wave velocity component.

It would be desirable to have a method of determination of seismic velocities as a function of angle of propagation in an earth formation using high quality borehole measurements. The present disclosure satisfies this need.

SUMMARY OF THE DISCLOSURE

One embodiment of the disclosure is a method of determining an anisotropic elastic property of an earth formation. A logging tool is conveyed into a borehole and a transducer on the logging tool is coupled to the borehole wall. The transducer is excited at a plurality of different orientations. Relative changes in impedance of the formation with orientation are estimated from the measurements. Additionally, using a calibration measurement, absolute values of the formation impedance and compressional wave velocity with orientation may be estimated.

Another embodiment of the disclosure is an apparatus for determining an anisotropic elastic property of an earth formation. The apparatus includes a transducer configured to be conveyed into a borehole, coupled to a wall of the borehole and excited at a plurality of different orientations. A processor is configured to estimate relative changes in impedance of the formation at the different orientations using the measurements. The processor may further use a calibration measurement to estimate absolute values of the formation impedance and the compressional wave velocity of the formation.

Another embodiment of the disclosure is a computer-readable medium accessible to a processor. The computer-readable medium includes instructions which enable the processor to estimate relative changes in impedance of the formation with orientation using measurements made by a transducer coupled to a borehole wall at a plurality of different orientations. The medium may include a ROM, an EPROM, an EEPROM, a flash memory, and/or an optical disk.

BRIEF DESCRIPTION OF THE DRAWINGS

For a detailed understanding of the present disclosure, reference should be made to the following detailed description of the preferred embodiment, taken in conjunction with the accompanying drawing and in which:

FIGS. 9a, 9b show two views of a logging tool with pad-mounted transducers of the type shown in FIGS. 7a and 7b or FIGS. 8a and 8b in a borehole.

DETAILED DESCRIPTION OF THE DISCLOSURE

The present disclosure is discussed with reference to specific logging instruments that may form part of a string of several logging instruments for conducting wireline logging operations. It is to be understood that the choice of the specific instruments discussed herein is not to be construed as a limitation and that the method of the present disclosure may also be used with other logging instruments as well.

Figure 1:
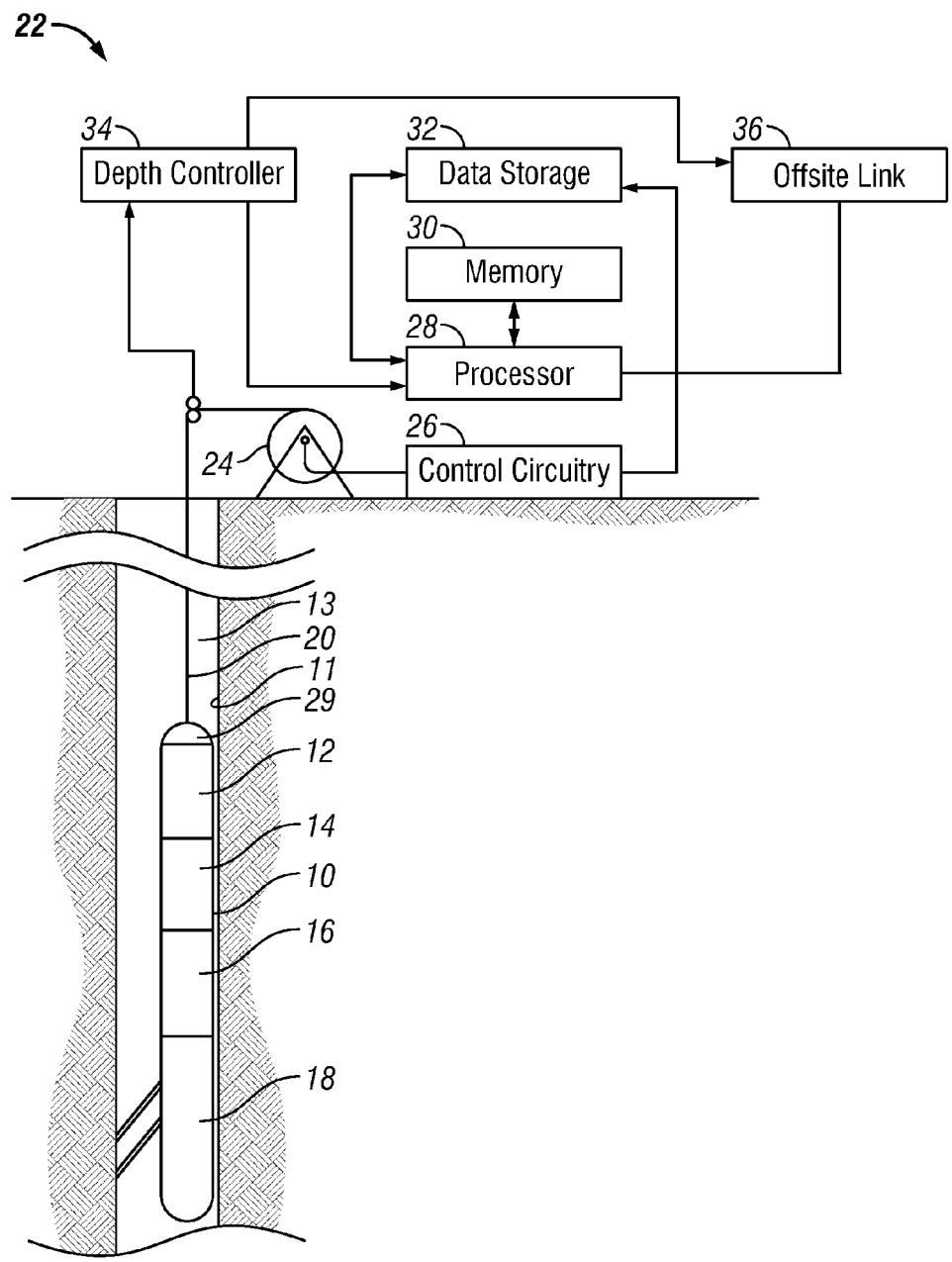
FIG. 1 is a schematic illustration of a wireline logging system.

A typical configuration of the logging system is shown in FIG. 1. This is a modification of an arrangement from U.S. Pat. No. 4,953,399 to Fertl et al., having the same assignee as the present disclosure, the contents of which are incorporated herein by reference. Shown in FIG. 1 is a suite of logging instruments 10, disposed within a borehole 11 penetrating an earth formation 13, illustrated in vertical section, and coupled to equipment at the earth's surface, in accordance with various illustrative embodiments of the method and apparatus of the present disclosure. Logging instrument suite 10 may include a resistivity device 12, a natural gamma ray device 14, and/or two porosity-determining devices, such as a neutron device 16 and/or a density device 18. Collectively, these devices and others used in the borehole for logging operations are referred to as formation evaluation sensors. The resistivity device 12 may be one of a number of different types of instruments known to the art for measuring the electrical resistivity of formations surrounding a borehole so long as such device has a relatively deep depth of investigation. For example, a HDIL (High Definition Induction Logging) device such as that described in U.S. Pat. No. 5,452,761 to Beard et al., having the same assignee as the present disclosure, the contents of which are fully incorporated herein by reference, may be used. The natural gamma ray device 14 may be of a type including a scintillation detector including a scintillation crystal cooperatively coupled to a photomultiplier tube such that when the crystal is impinged by gamma rays a succession of electrical pulses is generated, such pulses having a magnitude proportional to the energy of the impinging gamma rays. The neutron device 16 may be one of several types known to the art for using the response characteristics of the formation to neutron radiation to determine formation porosity. Such a device is essentially responsive to the neutron-moderating properties of the formation. The density device 18 may be a conventional gamma-gamma density instrument such as that described in U.S. Pat. No. 3,321,625 to Wahl, used to determine the bulk density of the formation. A downhole processor 29 may be provided at a suitable location as part of the instrument suite.

The logging instrument suite 10 is conveyed within borehole 11 by a cable 20 containing electrical conductors (not illustrated) for communicating electrical signals between the logging instrument suite 10 and the surface electronics, indicated generally at 22, located at the earth's surface. The logging devices 12, 14, 16, and/or 18 within the logging instrument suite 10 are cooperatively coupled such that electrical signals may be communicated between each of the logging devices 12, 14, 16, and/or 18 and the surface electronics 22. The cable 20 is attached to a drum 24 at the earth's surface in a manner familiar to the art. The logging instrument suite 10 is caused to traverse the borehole 11 by spooling the cable 20 on to or off of the drum 24, also in a manner familiar to the art.

The surface electronics 22 may include such electronic circuitry as is necessary to operate the logging devices 12, 14, 16, and/or 18 within the logging instrument suite 10 and to process the data therefrom. Some of the processing may be done downhole. In particular, the processing needed for making decisions on speeding up (discussed below) or slowing down the logging speed is preferably done downhole. If such processing is done downhole, then telemetry of instructions to speed up or slow down the logging could be carried out substantially in real time. This avoids potential delays that could occur if large quantities of data were to be telemetered uphole for the processing needed to make the decisions to alter the logging speed. It should be noted that with sufficiently fast communication rates, it makes no difference where the decision-making is carried out. However, with present data rates available on a wireline, the decision-making is preferably done downhole.

Control circuitry 26 contains such power supplies as are required for operation of the chosen embodiments of logging devices 12, 14, 16, and/or 18 within the logging instrument suite 10 and further contains such electronic circuitry as is necessary to process and normalize the signals from such logging devices 12, 14, 16, and/or 18 in a conventional manner to yield generally continuous records, or logs, of data pertaining to the formations surrounding the borehole 11. These logs may then be electronically stored in a data storage 32 prior to further processing. A surface processor 28 may process the measurements made by the formation evaluation sensor(s) 12, 14, 16, and/or 18. This processing could also be done by the downhole processor 29.

The surface electronics 22 may also include such equipment as will facilitate machine implementation of various illustrative embodiments of the method of the present disclosure. The surface processor 28 may be of various forms, but preferably is an appropriate digital computer programmed to process data from the logging devices 12, 14, 16, and/or 18. A memory unit 30 and the data storage unit 32 are each of a type to interface cooperatively with the surface processor 28 and/or the control circuitry 26. A depth controller 34 determines the longitudinal movement of the logging instrument suite 10 within the borehole 11 and communicates a signal representative of such movement to the surface processor 28. The logging speed is altered in accordance with speedup or slowdown signals that may be communicated from the downhole processor 29, and/or provided by the surface processor 28, as discussed below. This is done by altering the rotation speed of the drum 24. Offsite communication may be provided, for example, by a satellite link, by a telemetry unit 36.

Figure 2:
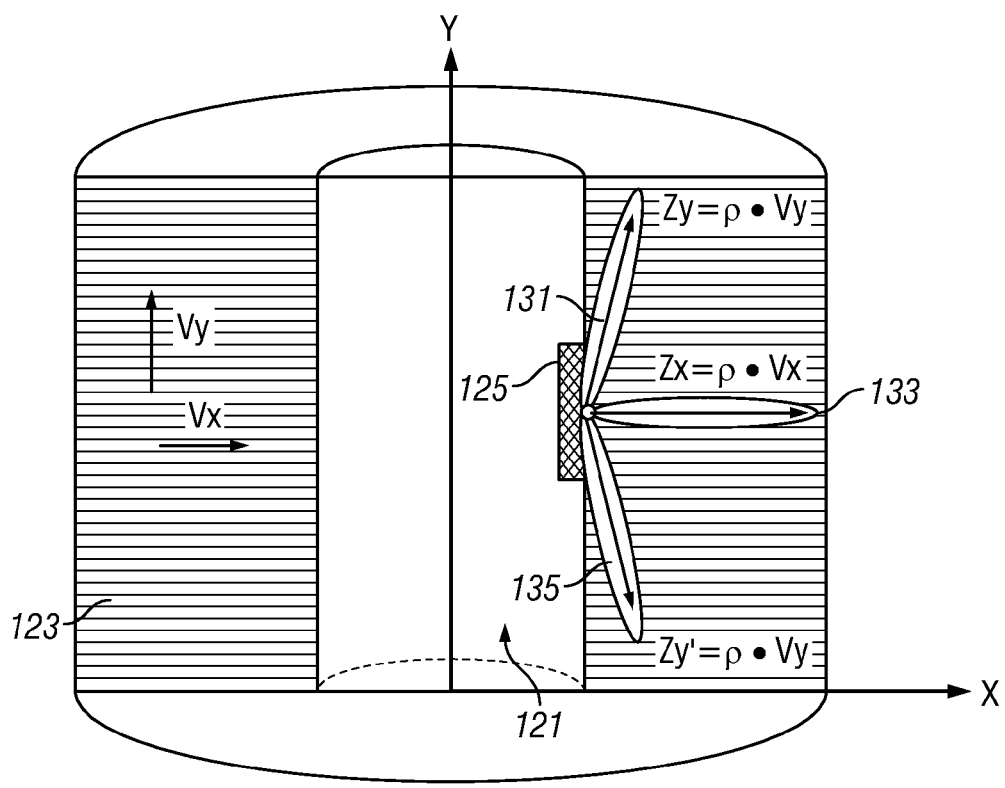
FIG. 2 illustrates the principle of the present disclosure.

Referring now to FIG. 2, a logging tool specific to various illustrative embodiments of the present disclosure is illustrated. The borehole 11 in an earth formation 123 is depicted by a borehole 121. Positioned within the borehole 121 and in contact with a wall of the borehole 121 is an array 125 of transducers. Each of the transducers of the array 125 may be a piezoelectric transducer of the type commonly used for making acoustic measurements in boreholes. A commonly used transducer is a bender bar that includes a disk and a piezoelectric material that flexes the disk in a bender action. The disk is fixed around its edge, as by a support ring, so that when a voltage is applied to the piezoelectric material, the center portion of the disk flexes. Alternatives to piezoelectric transducers include magnetostrictive, electromagnetic, and/or electromechanical transducers. The array 125 of transducers is part of one of the logging devices 12, 14, 16, and/or 18 that forms the logging instrument string. A feature of the present disclosure is electronic circuitry that sequentially activates the transducers of the array 125 to generate an elastic wave in a selected direction in the earth formation. Three such directions are shown in FIG. 2 by the beams 131, 133, and 135. In an anisotropic medium, each of these beams 131, 133, and 135 will have a different velocity of propagation. Recognizing that elastic impedance is the product of density and velocity, the problem of velocity determination is equivalent to the problem of determination of the elastic impedance of respective elastic waves traveling in different directions.

The fundamental physics behind the present disclosure is based on the fact that loading of an acoustic source with an external load causes a certain phase shift between the voltage and current applied to the source due to some impedance mismatch. If this phase shift is quantified and a specific relationship between the load impedance and measured phase shift is established, then the value of this impedance can be derived. In what follows next, a piezoceramic acoustic source loaded with a known medium is discussed. The source is excited in a resonance mode. The use of a piezoceramic material is for illustrative purposes and is not to be construed as a limitation.

In more formal terms, the problem can be formulated as follows:

It is necessary to estimate bulk anisotropy of a medium using data of input electric conductivity of a high-quality resonance transducer. The impedance measurement method is best understood using an electromechanical analogy. The equivalent circuit of the piezoceramic transducer is shown in FIG. 3. Here, U is the applied voltage to the transducer having a capacitance $C_0$ and electrical resistance $R_0$ and n is the electromechanical coupling factor between the transducer and the medium being investigated. The medium being investigated has an equivalent capacitance $C_m$, an equivalent mass denoted by the inductance $L_m$ and a resistance $R_m$. The vibrational velocity of the medium is denoted by $\xi$.

The medium to be tested is represented by a secondary circuit of a transformer, having the transformation factor n. The value of this factor corresponds to electromechanical coupling factor and depends on the size of the transducer as well as on the piezoelectric strain coefficient. $R_0$ has a very large value, since piezoceramics are poor conductors of electricity. $C_0$ is a characteristic of the transducer.

Figure 3A:
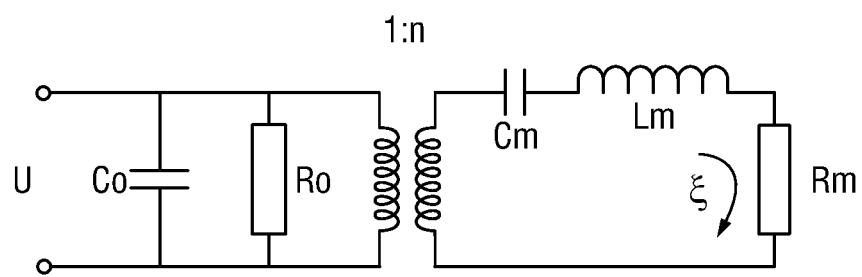
FIG. 3A shows an equivalent electromechanical circuit representing an electromagnetic transducer coupled to an earth formation.
Figure 3B:
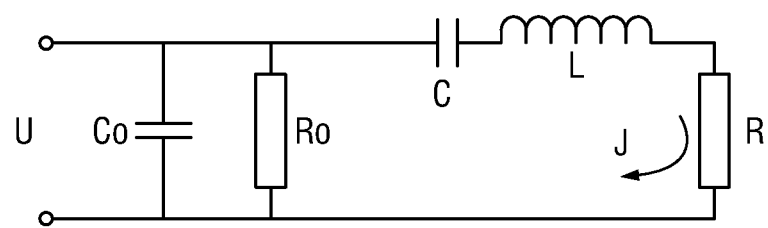
FIG. 3B shows an equivalent electrical circuit of the electromechanical circuit of FIG. 3A.

In FIG. 3A, $R_m$ may be represented by:

$$R_m = R_{tr} + (\rho c S)_m \qquad (1),$$

where $R_{tr}$ represents the mechanical loss of the transducer, $\rho$ is the density of the medium, c is the speed of sound, and S is the area of the radiating surface. The circuit can be reduced to an electric input using well-known rules, and is shown in FIG. 3B. The following transformation applies going from the electromechanical circuit of FIG. 3A to the electrical circuit of FIG. 3B:

$$C = C_m/n^2 \qquad (2)$$
$$L = L_m/n^2$$
$$R = R_m/n^2 \text{ and}$$
$$Y = G + jB = \frac{1}{R_0} + j\omega C_0 + \frac{1}{R + j\left(\omega L - \frac{1}{\omega C}\right)}$$

where Y, G, and B are respectively admittance, conductance, and susceptance of the transducer.

Figure 4:
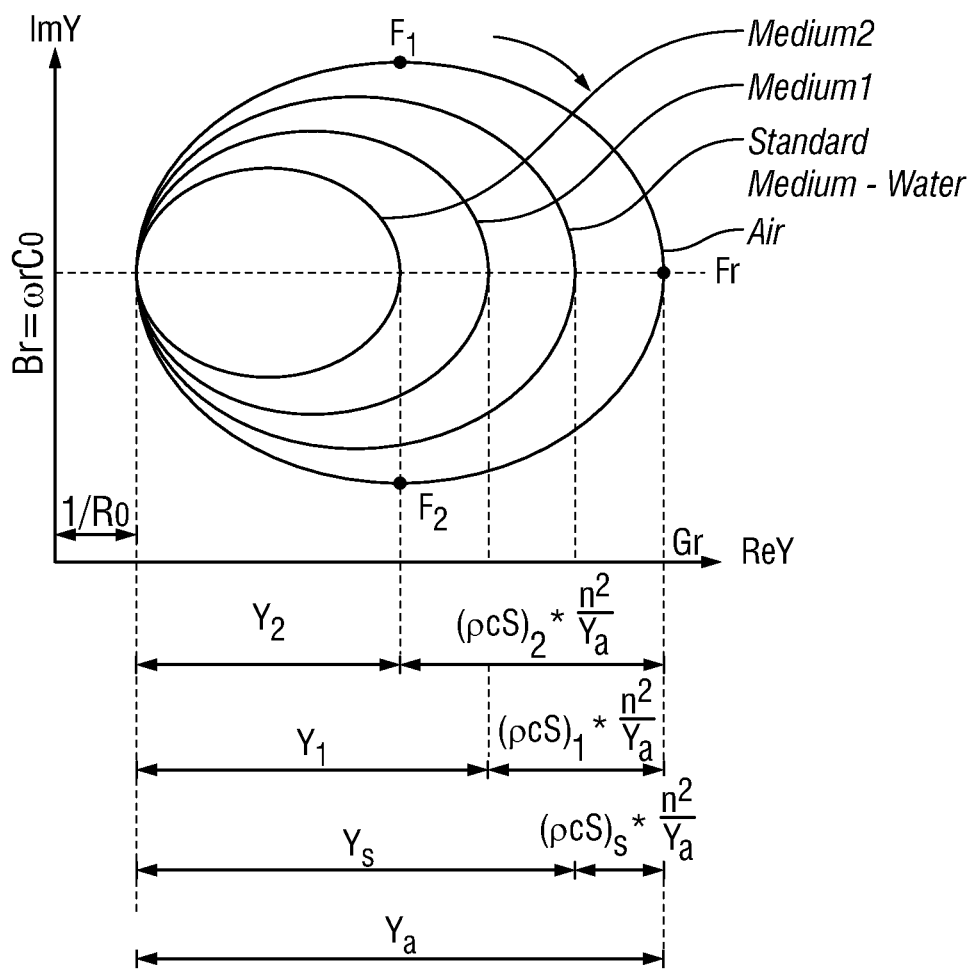
FIG. 4 shows a conductivity plot of an acoustic transducer coupled to a medium.

Vector diagrams of the conductivity of the transducer may be represented as circles as shown in a Nyquist diagram in FIG. 4. The abscissa is the real part of the conductivity and the ordinate is the imaginary part of the conductivity. The parameter of the diagrams is frequency. Of particular interest is the right extreme point of each circle. The extreme right point corresponds to the resonant frequency $F_r$, given by $$F_r = \frac{1}{2\pi\sqrt{LC}}, \qquad (3)$$

with the corresponding horizontal and vertical coordinates $$G_r = \frac{1}{R_0} + \frac{1}{R} \text{ and } B_r = \omega_r C_0. \qquad (4)$$

It is obvious that the left extreme point of each circle coincides with all other left points of all circles and has horizontal coordinate $$\frac{1}{R_0}.$$

The diameter of each circle depends upon the medium in contact with the device since it is inversely proportional to total resistance of the mechanical loss of the transducer loaded on the medium, i.e., equal to $$\frac{1}{R}.$$

The largest diameter $Y_a$ corresponds to the case where the transducer is in contact with air. Other points are used just to make sure that there are no other resonances nearby, i.e., within a frequency band $F_1$-$F_2$. The resonances may be caused, for example, by standing waves generated in a sample of finite size, or by additional capacitances and inductances not accounted for in the model. For the case of air loading, the characteristic resistance may be assumed to be zero. Hence the conductivity of the device is defined only by the mechanical loss of the transducer itself and by $$Y_a = \frac{n^2}{R_{tr}}.$$

Other circles have smaller diameters. These diameters can be obtained from $Y_a$ by subtraction of the corresponding wave impedance $(\rho c S)_m$ taken with the dimensional factor $$\frac{Y_a}{n^2}.$$

Here, S is the radiation area which, for one embodiment of the device, represents the area of contact between two cylindrical rods with a plane surface along the generatrix. For these measurements, it is desirable to consistently maintain the same contact conditions. If this condition is satisfied, knowledge of the absolute value of the area of contact is not essential. The knowledge of n is not important in calculating anisotropy. This is discussed below.

Figure 5:
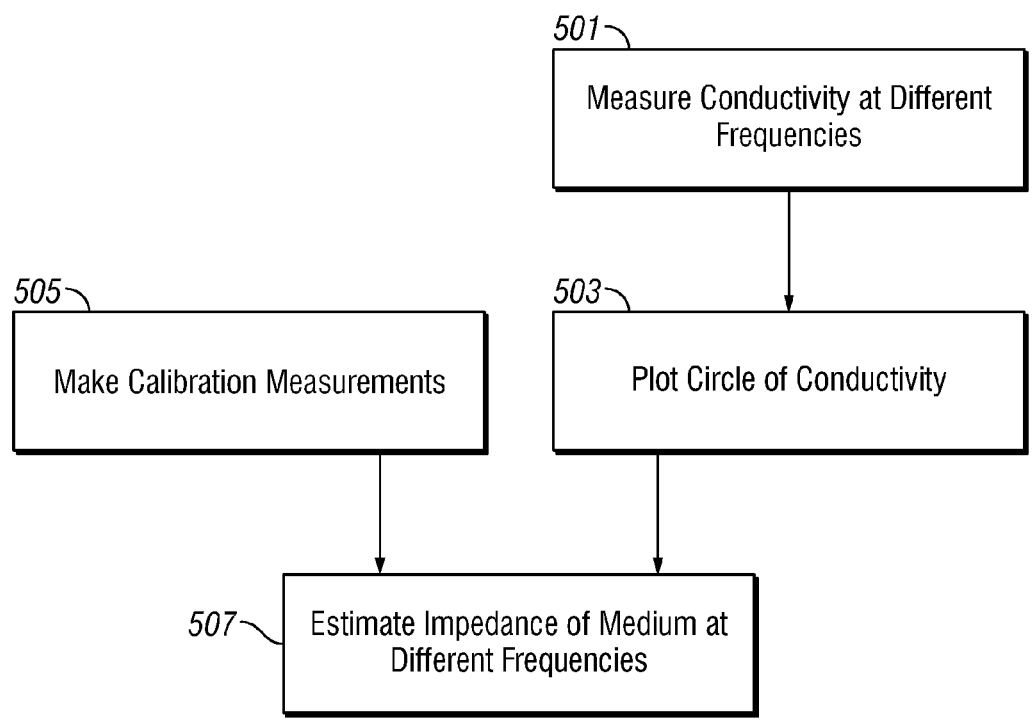
FIG. 5 illustrates some of the steps involved in determining anisotropy.

In one embodiment of the disclosure, the following steps are carried out, as illustrated in FIG. 5. Measurements of conductivity are made at different frequencies 501. The circle of conductivity is plotted 503 to make sure there are no resonances in the proximity of the resonant frequency. Such resonances may be caused by capacitances and inductances other than those considered in the model of FIG. 3 and will show up as deviations from the circle expected for the model. For calibration, additional measurements of electric conductivity of the transducer loaded both with the air $Y_a$ and with a standard well known medium (e.g. water, $Y_s$) are necessary for numerical evaluation of the value of acoustic impedance of the medium. This allows calculation of the impedance of medium 1 (for example) according to the following formula.

$$(\rho c S)_1 = (\rho c S)_s \frac{(Y_a - Y_1)}{(Y_a - Y_s)}. \quad (4)$$

For measurements of impedance ratios (e.g., between two media or the same medium at different orientations), this gives the result $$\frac{(\rho c S)_1}{(\rho c S)_2} = \frac{(Y_a - Y_1)}{(Y_a - Y_2)}. \quad (5)$$

This means that the anisotropy factor (velocity ratio) may be obtained by calculating the ratio of horizontal lengths connecting the extreme right edges of the circles for both media and the air circle. Absolute impedance values may be estimated using one more reference calibration measurement circle, e.g., for water.

Figure 6A:
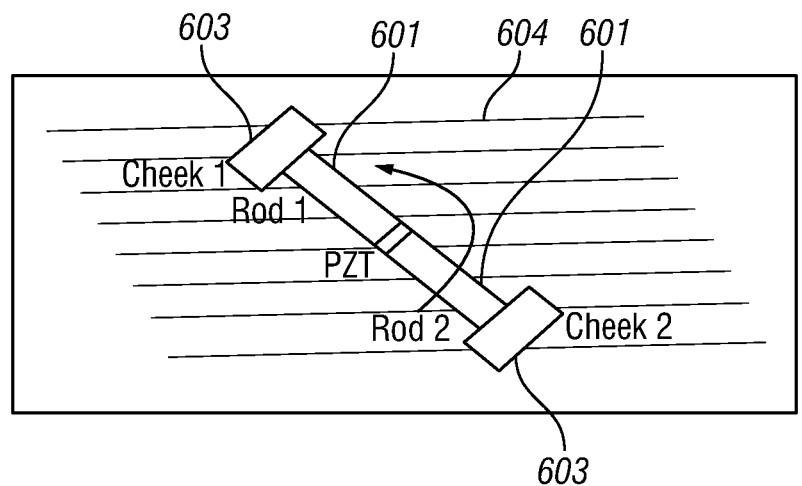
FIGS. 6A, 6B show a laboratory setup for measuring impedance at different angles to the bedding plane.
Figure 6B:
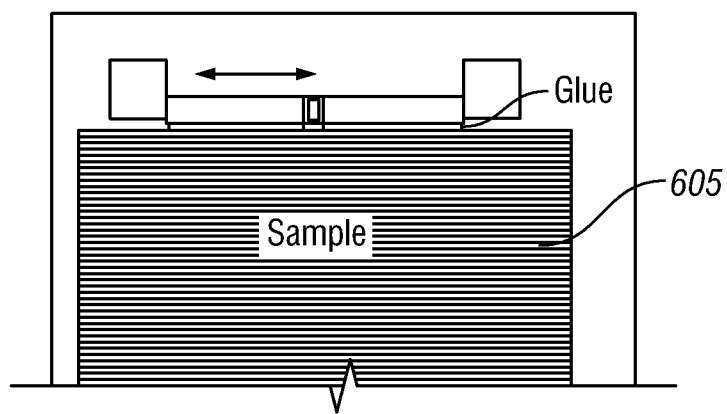

The feasibility of making measurements at different orientations to the bedding plane has been evaluated using the setup shown in FIGS. 6A-6B. Two steel rods 601 are glued to the surface of the sample 605 and connected to a piece of lead zirconium titanate (PZT hereinafter). Needles serve to maintain electric contact. The cheeks 603 and wooden adaptors have no acoustic contact with the sample. Stripes 604 show the direction of anisotropy of the sample and the arrow shows the rotation direction of a device. The rotation makes it possible to make measurements at different direction to the anisotropy direction. Upon excitation by a broadband signal with a bandwidth of up to 250 kHz, the PZT generates a standing wave in the sample.

Resonances due to standing waves are observed beginning with a half-wave resonance. Notwithstanding these resonances, it was possible to measure changes in acoustic impedance with angle. However, gluing the transducer to the sample is obviously not practical for borehole measurements.

Figure 7A:
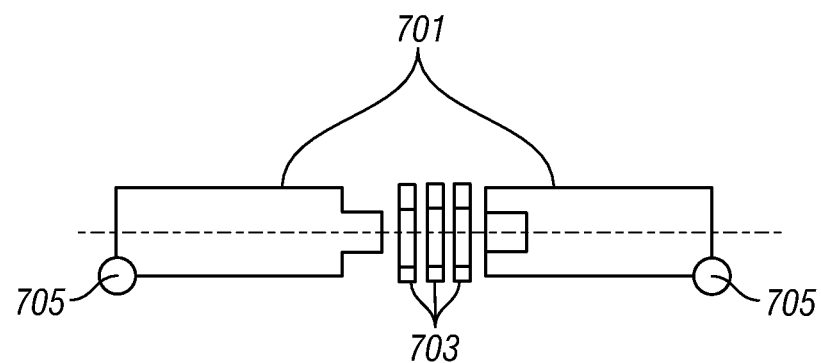
FIGS. 7A, 7B show arrangements in which point contact is provided for the transducers.
Figure 7B:
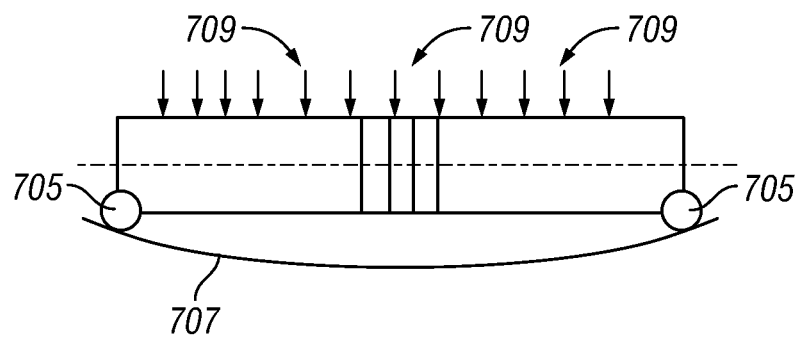

FIG. 7A shows an arrangement in which PZT rings 703 are mounted between two titanium rods 701 that are supported by ball-bearings 705. This makes it possible to freely rotate the orientation of the PZT transducers relative to the bedding. In FIG. 7B, the transducer assembly is shown in a curved borehole 707 wherein a force 709 is applied to maintain contact with the borehole wall.

Figure 8A:
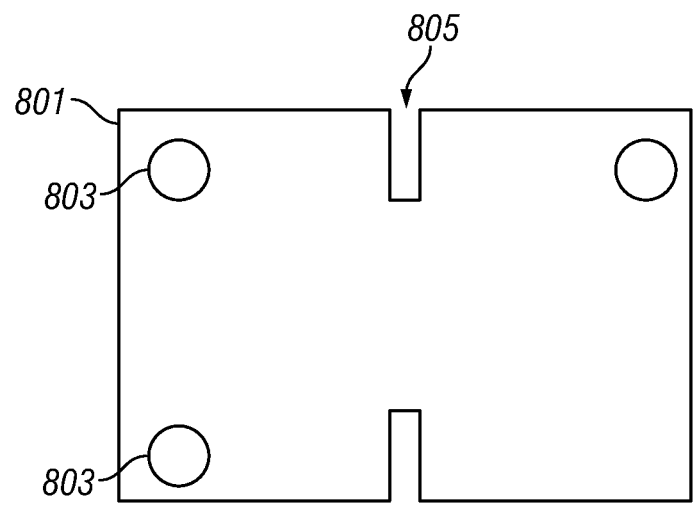
FIGS. 8A, 8B show a transducer configuration mounted on a plate supported by ball-bearings.
Figure 8B:
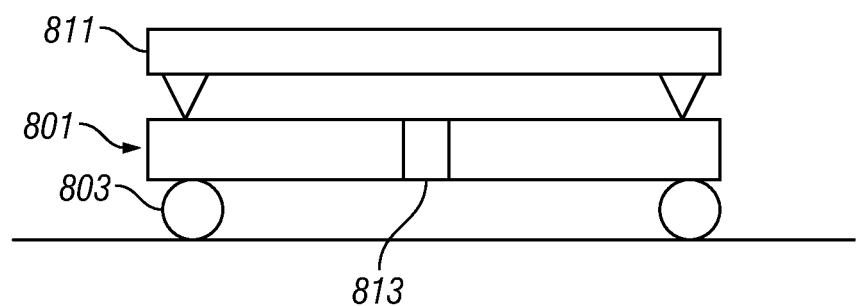

Turning now to FIG. 8A, a plate 801 is shown with ball bearings 803. The plate is provided with slots 805 in which the transducers may be positioned. A pressure adaptor 811 is provided so as to maintain uniform loading of the transducers 813. A force of 200-300N is found to be adequate to provide repeatable and reliable results.

The method of using the present disclosure thus involves making calibration measurements prior to going into the borehole. The calibration includes making measurements in air and water, and may further involve making measurements with a nominal force using the pressure adaptor against an isotropic material of known properties. Within the borehole, measurements made at two orthogonal orientations (parallel to the borehole axis and in a circumferential direction) give one measurement of anisotropy. However, as discussed below, a third measurement made at an intermediate angle is needed to completely characterize the anisotropy.

For the case of transverse isotropy (TI), the TI medium is characterized by five elastic moduli. These may be denoted by the tensor $$\begin{bmatrix} C_{11} & C_{11}-2C_{66} & C_{13} & 0 & 0 & 0 \\ C_{11}-2C_{66} & C_{11} & C_{13} & 0 & 0 & 0 \\ C_{13} & C_{13} & C_{33} & 0 & 0 & 0 \\ 0 & 0 & 0 & C_{44} & 0 & 0 \\ 0 & 0 & 0 & 0 & C_{44} & 0 \\ 0 & 0 & 0 & 0 & 0 & C_{66} \end{bmatrix}, \quad (6)$$

where the modulus $C_{11}$ defines the velocity of a horizontally propagating P-wave, $C_{33}$ defines the velocity of a vertically propagating P-wave, $C_{44}$ defines the velocity of a vertically propagating shear wave, and $C_{66}$ defines the velocity of a horizontally propagating S-wave (shear wave) with horizontal polarization. These four parameters are determinable by making suitable measurements of P- and S-waves parallel to and perpendicular to the symmetry axis. The elements of the matrix of Eqn. (6) may be referred to as elements of an elastic stress tensor.

Daley and Hron showed that the compressional velocity for plane waves propagating at an angle θ to the symmetry axis is given by $$2\rho V_p^2 = C_{33} + C_{44} + (C_{11} - C_{33})\sin^2\theta + D(\theta) \quad (7),$$

where $$D(\theta) = \{(C_{33}-C_{44})^2 + 2[2(C_{13}+C_{44})^2 - (C_{33}-C_{44})(C_{11}+C_{33}-2C_{44})]\sin^2\theta + [(C_{11}+C_{33}-2C_{44})^2 - 4(C_{13}+C_{44})^2]\sin^4\theta\} \quad (8).$$

This is a function of only $C_{11}$, $C_{33}$, $C_{44}$ and $C_{13}$, so that knowledge of these four parameters is sufficient to be able to perform migration and imaging of compressional wave data.

For various illustrative embodiments of the present disclosure, $C_{11}$ can be obtained by measuring the impedance to compressional waves radiating out in a plane perpendicular to the borehole. This can be done by making measurements in which the transducer 801 is vibrated in a plane orthogonal to the longitudinal axis of the tool. $C_{33}$ can be obtained by measuring the impedance of a compressional wave propagating parallel to the borehole, or with transducer 805 vibration orthogonal to the bedding plane. However, it is much easier to get the compressional wave velocity for a compressional wave parallel to the borehole using a conventional sonic log. The parameter $C_{44}$ can be obtained using a dipole shear-logging tool. In each case, the elastic modulus $C_{ij}$ is given by the square of the velocity multiplied by density. Getting the parameter $C_{13}$ requires a measurement of the P-wave velocity (or impedance) at an intermediate angle.

FIG. 9a, 9b show an example of how the transducers of the type 701, 801 (shown here as 701', 801') may be mounted on pads. The body of the logging tool 125 is provided with a plurality of pads 901a, 901b, 901c . . . . In the example, six pads are provided but this is not to be construed as a limitation. Use of six pads makes it possible to measure the azimuthal variation of the acoustic impedance. Each of the pads is mounted on an extendable arm 903 and with a transducer of the type described above (701 or 801). The extendable arms make it possible to maintain the transducer in contact with the borehole wall. The transducers are provided with a rotatable mount so that impedance measurements can be made at different angles to the anisotropy axis of the formation.

In one embodiment of the disclosure, a formation density may be estimated using the impedance measurements made for a P-wave along the borehole axis and a conventional P-wave measurement. Alternatively, a density measurement may be made using a convention nuclear logging device. The estimated or measured density may then be used together with the estimated anisotropic impedance to give an anisotropic velocity model of the earth formation that is used for migration of surface seismic data or of offset data acquired in vertical seismic profiling.

The present disclosure has been described above in terms of a wireline implementation. The method of the present disclosure may also be used in a measurement-while-drilling (MWD) implementation. For example, the transducer array may be on a non-rotating sleeve that is part of a bottomhole assembly conveyed downhole on a drilling tubular. Such a non-rotating sleeve is described in U.S. Pat. No. 6,247,542 of Kruspe et al, having the same assignee as the present disclosure, the contents of which are incorporated herein by reference.

The processing of the measurements made in wireline applications may be done by the surface processor 28, by the downhole processor 29, or at a remote location. The data acquisition may be controlled at least in part by the downhole electronics. Implicit in the control and processing of the data is the use of a computer program on a suitable machine readable-medium that enables the processors to perform the control and processing. The machine-readable medium may include ROMs, EPROMs, EEPROMs, flash memories and optical disks. The term processor is intended to include devices such as a field programmable gate array (FPGA).

While the foregoing disclosure is directed to specific embodiments of the present disclosure, various modifications will be apparent to those skilled in the art. It is intended that all variations within the scope of the appended claims be embraced by the foregoing disclosure.

What is claimed is:

1. A method of evaluating an earth formation, the method comprising:
   conveying a logging tool into a borehole;
   exciting at least one transducer on the logging tool at a first orientation and a second orientation to the wall of the borehole;
   using a first measured impedance of the transducer at a first resonant frequency at the first orientation and a second measured impedance at a second resonant frequency at the second orientation for estimating a ratio of a compressional velocity of the formation at the first orientation and a compressional velocity of the formation at the second orientation; and
   using the estimated ratio of the compressional velocities for conducting further exploration of the formation.

2. The method of claim 1 further comprising measuring an impedance at an additional frequency close to at least one of: (i) the first resonant frequency, and (ii) the second resonant frequency to confirm an absence of any other resonance.

3. The method of claim 1 further comprising making a first calibration measurement and a second calibration measurement using the at least one transducer in a first medium having a known acoustic impedance and a second medium having a known acoustic impedance.

4. The method of claim 3 further comprising using the first calibration measurement and the second calibration measurement to estimate at least one of: (i) an acoustic impedance of the formation at the first orientation, and (ii) an acoustic impedance of the formation at the second orientation.

5. The method of claim 1 wherein making a measurement at a resonant frequency further comprises making a measurement at a plurality of frequencies and identifying the resonant frequency therefrom.

6. The method of claim 1 further comprising conveying the logging tool into the borehole on a wireline.

7. The method of claim 1 wherein the first orientation is in a vertical direction and the second orientation is in a circumferential direction, the method further comprising:
   (i) measuring an impedance of the transducer at an additional angle between the first orientation and the second orientation,
   (ii) measuring a shear velocity of the formation in the vertical direction and a circumferential direction; and
   (iii) using the measured impedance at the additional angle, the shear velocity at the first orientation and the second orientation to derive a compressional wave velocity field in the earth formation and perform an anisotropic migration of a line of surface seismic data.

8. An apparatus configured to evaluate an earth formation, the apparatus comprising:
   a logging tool configured to be conveyed into a borehole;
   at least one transducer on the logging tool configured to be excited at a first orientation and a second orientation to the wall of the borehole;
   a processor configured to:
      use a first measured impedance of the transducer at a first resonant frequency at the first orientation and a second measured impedance at a second resonant frequency at the second orientation to estimate a ratio of a compressional velocity of the formation at the first orientation and a compressional velocity of the formation at the second orientation; and
      use the estimated ratio of the compressional velocities for conducting further exploration of the formation.

9. The apparatus of claim 7 wherein the at least one transducer is further configured to make a first calibration measurement and a second calibration measurement in a first medium having a known acoustic impedance and a second medium having a known acoustic impedance.

10. The apparatus of claim 9 wherein the processor is further configured to use the first calibration measurement and the second calibration measurement to estimate at least one of: (i) an acoustic impedance of the formation at the first orientation, and (ii) an acoustic impedance of the formation at the second orientation.

11. The apparatus of claim 7 further comprising a wireline configured to convey the logging tool into the borehole.

12. A computer-readable medium having instructions thereon that when read by at least one processor cause the at least one processor to execute a method, the method comprising:
  using a first measurement of an impedance at a first resonant frequency of at least one transducer in contact with a wall of a borehole at a first orientation and a second measurement of an impedance at a second resonant frequency of the at least one transducer at a second orientation to estimate a ratio of the first impedance and the second impedance; and
  using the estimated ratio of the compressional velocities for conducting further exploration of the formation.

13. The computer-readable medium of claim 12 further comprising at least one of: (i) a ROM, (ii) an EPROM, (iii) an EEPROM, (iv) a flash memory, and (v) an optical disk.

* * * * *